(12) United States Patent
Botargues et al.

(10) Patent No.: US 9,092,980 B2
(45) Date of Patent: Jul. 28, 2015

(54) METHOD AND DEVICE OF TERRAIN AVOIDANCE FOR AN AIRCRAFT

(75) Inventors: Paule Botargues, Toulouse (FR); Nicolas Caule, Toulouse (FR); Christelle Ledauphin, Toulouse (FR); Jérôme Bailly, Toulouse (FR); Isabelle Lacaze, Colomiers (FR); Sylvain Thezelais, Toulouse (FR); Jérôme Goyet, Blagnac (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 701 days.

(21) Appl. No.: 12/617,244

(22) Filed: Nov. 12, 2009

(65) Prior Publication Data

US 2010/0125381 A1     May 20, 2010

(30) Foreign Application Priority Data

Nov. 14, 2008   (FR) ..................................... 08 06363

(51) Int. Cl.
  *G08G 5/04*    (2006.01)
  *G01C 5/00*    (2006.01)
(52) U.S. Cl.
  CPC . *G08G 5/04* (2013.01); *G01C 5/005* (2013.01)
(58) Field of Classification Search
  CPC .................................. G08G 5/04; G01C 5/005
  USPC ................... 701/4, 8, 9, 11, 14, 17, 409, 412; 342/29, 59, 61–65; 340/945, 970; 244/75.1, 76 R, 175, 180, 196
  See application file for complete search history.

(56) References Cited

U.S. PATENT DOCUMENTS

| | | | | |
|---|---|---|---|---|
| 3,505,641 A | * | 4/1970 | Boskovich | 340/974 |
| 3,946,358 A | * | 3/1976 | Bateman | 340/970 |
| 4,567,483 A | * | 1/1986 | Bateman et al. | 340/970 |
| 4,593,285 A | * | 6/1986 | Miller et al. | 340/968 |
| 5,220,322 A | * | 6/1993 | Bateman et al. | 340/970 |
| 5,839,080 A | * | 11/1998 | Muller et al. | 701/9 |
| 6,281,832 B1 | | 8/2001 | McElreath | |

(Continued)

FOREIGN PATENT DOCUMENTS

| | | |
|---|---|---|
| EP | 0 802 469 | 10/1997 |
| EP | 1 517 211 | 3/2005 |

(Continued)

OTHER PUBLICATIONS

Department of Transportation Federal Aviation Administration Aircraft Certification Service, Washington DC, Technical Standard Order C151b, Dec. 17 2002, (TSO-C151b).*

(Continued)

*Primary Examiner* — John Q Nguyen
*Assistant Examiner* — Michael Whalen
(74) *Attorney, Agent, or Firm* — Novak Druce Connolly Bove + Quigg LLP

(57) ABSTRACT

According to the invention, a terrain avoidance maneuver is engaged when the alerts of a given pair of alerts are emitted simultaneously, the triggering of one of the alerts depending on the information provided by a first measurement chain and the triggering of the other alert of the pair relying on information provided by a second measurement chain, distinct from and independent of the first chain.

10 Claims, 2 Drawing Sheets

(56) References Cited

U.S. PATENT DOCUMENTS

| | | | |
|---|---|---|---|
| 6,285,298 B1* | 9/2001 | Gordon | 340/945 |
| 6,324,448 B1* | 11/2001 | Johnson | 701/7 |
| 6,480,789 B2* | 11/2002 | Lin | 701/301 |
| 6,584,384 B2* | 6/2003 | Gremmert et al. | 701/4 |
| 7,098,810 B2* | 8/2006 | Bateman et al. | 340/963 |
| 7,120,540 B2* | 10/2006 | Meunier | 701/301 |
| 7,633,410 B2* | 12/2009 | Poe | 340/963 |
| 7,633,430 B1* | 12/2009 | Wichgers et al. | 342/65 |
| 7,859,449 B1* | 12/2010 | Woodell et al. | 342/65 |
| 8,077,055 B2* | 12/2011 | Baillon et al. | 340/968 |
| 8,223,039 B2* | 7/2012 | Campagne et al. | 340/971 |
| 8,432,308 B2* | 4/2013 | Delga et al. | 342/120 |
| 8,515,600 B1* | 8/2013 | McCusker | 701/9 |
| 2001/0047230 A1* | 11/2001 | Gremmert et al. | 701/4 |
| 2002/0032504 A1* | 3/2002 | Johnson | 701/7 |
| 2003/0184450 A1* | 10/2003 | Muller et al. | 340/963 |
| 2006/0247828 A1* | 11/2006 | Ardila et al. | 701/3 |
| 2007/0050101 A1* | 3/2007 | Sacle et al. | 701/11 |
| 2007/0239326 A1* | 10/2007 | Johnson et al. | 701/9 |
| 2009/0082954 A1* | 3/2009 | Ridenour, II | 701/206 |
| 2010/0010694 A1* | 1/2010 | Johnson et al. | 701/9 |
| 2010/0042273 A1* | 2/2010 | Meunier et al. | 701/9 |
| 2010/0090867 A1* | 4/2010 | Christophe et al. | 340/970 |
| 2010/0302074 A1* | 12/2010 | Campagne et al. | 340/971 |
| 2011/0148665 A1* | 6/2011 | Dehais et al. | 340/963 |
| 2013/0211632 A1* | 8/2013 | Caule et al. | 701/3 |

FOREIGN PATENT DOCUMENTS

| | | |
|---|---|---|
| EP | 1 843 127 | 10/2007 |
| FR | 2 883 403 | 3/2005 |
| WO | WO 2006/097592 | 9/2006 |

OTHER PUBLICATIONS

Federal Aviation Administration, Aircraft Certification Service: "TSO-C151b," Dept. of Transportation, XP002536338, pp. 3-9, Dec. 17, 2002.

Vigier, Christine, "T2CAS-Upgrading Your Aircraft by Combining TCAS and TAWS in One Unit," Flight Airworthiness Support Technology, XP002536337, No. 36, pp. 16-20, Jul. 2006.

* cited by examiner

METHOD AND DEVICE OF TERRAIN AVOIDANCE FOR AN AIRCRAFT

CROSS-REFERENCE TO RELATED APPLICATIONS

This application claims priority to French Patent Application 0806363, filed Nov. 14, 2008, the entire contents of which are incorporated herein by reference.

FIELD OF THE INVENTION

The present invention relates to a terrain avoidance method and system for aircraft, and also to an aircraft provided with such a system.

BACKGROUND OF THE INVENTION

It is known that numerous aircraft are equipped with a collision alert device making it possible to emit at least one alert signal in the event of a risk of the aircraft colliding with the terrain. Concerning the alert device, it may in particular be a device of TAWS ("Terrain Awareness and Warning System") type, of EGPWS ("Enhanced Ground Proximity Warning System") type or of GCAS ("Ground Collision Avoidance System") type.

More precisely, such a TAWS collision alert device is generally capable of emitting the following various types of alerts, the triggerings of which are based on different algorithms and sources of information:
  a first type of alerts, called "reactive" alerts, the triggering of which is based mainly on information provided by a radioaltimeter of the aircraft. There exist various categories of reactive alerts, designated by "Mode 1", "independent Mode 1", "Mode 2", etc., which all detect potential risks of collision of the aircraft with the terrain, but the triggering of which relies on information provided by different measurement chains. Thus, the triggering of the Mode 1 reactive alert depends on the height of the aircraft above the terrain as determined by the radioaltimeter of the aircraft, and also on the vertical speed of the aircraft as provided by the onboard inertial platforms. On the other hand, the triggering of the independent Mode 1 reactive alert depends, on the one hand, on the height of the aircraft above the terrain as determined by onboard GPS ("Global Positioning System") positioning means and also on a terrain database giving the altitude of the terrain and, on the other hand, on the vertical speed of the aircraft as provided by said GPS means. Moreover, the triggering of the Mode 2 reactive alert is dependent on the height of the aircraft above the terrain as determined by the radioaltimeter and also on the temporal derivative of this height;
  a second type of alerts, called "predictive" alerts, the triggering of which relies on information contained in one or more databases (for example of terrain, obstacle, airport runway type, etc.). Predictive alerts such as these are for example called FLTA ("Forward Looking Terrain Alerting") alerts when the database used is of terrain type, or else PDA ("Premature Descent Alerting") alerts when the database used is of airport runway type.

A terrain avoidance system for a civilian airplane equipped with a collision alert device of TAWS type is known through the document FR-2883403. This system automatically triggers a terrain avoidance maneuver when the collision alert device emits an alert (reactive or predictive) to signal that the airplane risks colliding with the terrain if it maintains its current flight characteristics. Thus, as soon as an alert is emitted, the system acts automatically (without pilot intervention) on the trajectory of the airplane, so as to improve the situation of the latter with respect to the terrain.

However, the reactive alerts being emitted after analyzing information provided mainly by the radioaltimeter of the airplane which can only detect the altitude of the terrain under the airplane, it may happen that some of these emitted reactive alerts do not allow genuine anticipation of the risks of the airplane colliding with the relief of the terrain situated ahead of it.

Furthermore, the predictive alerts are, for their part, dependent on the reliability and the precision of the databases used to trigger them. Hence, it may transpire that errors are present in these databases, sometimes giving rise to the emission of untimely predictive alerts, whereas in reality there is no substantiated danger of the airplane colliding with the terrain.

Moreover, certain terrain geometries are such that they do not bring about the emission of predictive alerts by the TAWS collision alert device. Thus, although the situation of the airplane with respect to the terrain so requires, it may transpire that no terrain avoidance maneuver is triggered if the triggering of such a maneuver relies only on the emission of a predictive alert.

SUMMARY OF THE INVENTION

The object of the present invention is therefore to remedy these drawbacks by refining the aforesaid terrain avoidance system and in particular by reducing the number of untimely triggerings and of non-triggerings of such a maneuver.

To this end, according to the invention, the terrain avoidance method for an aircraft equipped with a collision alert device which monitors the flight of said aircraft with respect to the surrounding terrain and which is able to emit at least one alert, when said aircraft risks colliding with the terrain on maintaining its current flight characteristics, according to which method a terrain avoidance maneuver is engaged when engagement conditions are validated, is notable:
  in that said engagement conditions are validated when the alerts of at least one pair of alerts are emitted simultaneously, the triggering of one of the alerts of said pair relying on information provided by a measurement chain and the triggering of the other alert of said pair relying on information provided by another measurement chain; and
  in that said measurement chains are distinct and independent.

Thus, by using the combination of two alerts (reactive and/or predictive) able to signal one and the same type of risk of the aircraft colliding with the terrain (for example a conflict with the relief, an excessive descent, a premature descent, etc.) but on the basis of information originating from different and independent measurement chains, the number of untimely triggerings of a terrain avoidance maneuver is reduced.

Advantageously, when said aircraft is equipped with at least one radioaltimeter, one of the alerts of said pair of alerts can be a Mode 2 reactive alert, the triggering of which depends on the height of said aircraft above the terrain as determined by said radioaltimeter and also on the temporal derivative of this height, and the other alert of said pair of alerts can be an FLTA predictive alert, the triggering of which relies on information contained in at least one topographic database giving the altitude of the terrain.

Thus, the combination of a Mode 2 reactive alert and of an FLTA predictive alert makes it possible to detect a potential risk of conflict with the relief of the terrain overflown by the aircraft.

As a variant, said aircraft being equipped with at least one radioaltimeter, with inertial platforms and with positioning means of GPS type, one of the alerts of said pair of alerts can advantageously be a Mode 1 reactive alert, the triggering of which depends on the height of said aircraft above the terrain as determined by said radioaltimeter, and also on the vertical speed of said aircraft as provided by said inertial platforms, and the other alert of said pair of alerts can advantageously be an independent Mode 1 alert, the triggering of which depends, on the one hand, on the height of said aircraft above the terrain as determined by said GPS positioning means and also on a topographic database giving the altitude of the terrain and, on the other hand, on the vertical speed of said aircraft as provided by said GPS positioning means.

Thus, the combination of a Mode 1 reactive alert and of an independent Mode 1 reactive alert makes it possible to detect an excessive descent of the aircraft liable to lead to a collision with the terrain overflown.

Moreover, said engagement conditions can advantageously be validated when at least one of the following alert conditions is satisfied:
  the alerts of a first pair of alerts are emitted simultaneously, the triggering of one of the alerts (for example a Mode 2 reactive alert) of said first pair relying on information provided by a measurement chain and the triggering of the other alert (for example an FLTA predictive alert) of said first pair relying on information provided by another measurement chain;
  the alerts of a second pair of alerts are emitted simultaneously, the triggering of one of the alerts (for example a Mode 1 reactive alert) of said second pair relying on information provided by a measurement chain and the triggering of the other alert (for example an independent Mode 1 reactive alert) of said second pair relying on information provided by another measurement chain,
said measurement chains for measuring said first pair and said second pair being pairwise distinct and independent.

Thus, the detection of potential risks of collision of the aircraft with the terrain is improved by detecting several different types of risks. The validation of the conditions for engaging said avoidance maneuver can advantageously be accompanied by a broadcasting of a visual and/or audible information cue (for example an alarm) to inform the pilots of the aircraft of a risk of collision with the terrain and warn them of the future triggering of the avoidance maneuver.

Moreover, said engagement conditions can be validated when at least one of said alerts is emitted continuously, by said collision alert device, for at least one predetermined duration threshold (for example a few seconds) to ensure that there is a manifest requirement to trigger the terrain avoidance maneuver.

Moreover, when said engagement conditions are validated, it is possible to wait a predefined lag before engaging said terrain avoidance maneuver.

Thus, in particular when the validation of the engagement conditions is accompanied by the broadcasting of a visual and/or audible information cue, the pilots of the aircraft have the possibility of reacting manually and of extricating the aircraft from a potentially critical situation.

In the case where the emission of the aforesaid reactive and predictive alerts is accompanied by the broadcasting of a visual and/or audible warning to warn the pilots of a potential risk of collision, the predefined lag can be reduced with respect to that implemented when there is no warning broadcast, so as to anticipate the terrain avoidance maneuver and thus increase its chances of success.

Moreover, the invention also relates to a terrain avoidance system for an aircraft which comprises:
  a collision alert device which monitors the flight of said aircraft with respect to the surrounding terrain and which is able to emit at least one alert, when said aircraft risks colliding with the terrain on maintaining its current flight characteristics; and
  an automatic piloting device able to apply a terrain avoidance maneuver to said aircraft automatically when engagement conditions are validated.

According to the invention, said terrain avoidance system is noteworthy in that it furthermore comprises a logic device for verifying said engagement conditions, able to verify that the alerts of at least one pair of alerts are emitted simultaneously, the triggering of one of the alerts of said pair relying on information provided by a first measurement chain and the triggering of the other alert of said pair relying on information provided by a second measurement chain, distinct from and independent of said first measurement chain.

Preferably, the terrain avoidance system can also comprise comparison means, able to compare the duration of continuous emission of said alerts, emitted by said collision alert device, with a predetermined duration threshold, so that said engagement conditions are validated when at least one of said alerts is emitted continuously for a duration at least equal to said threshold.

When said engagement conditions are validated, said automatic piloting device can advantageously wait a predefined lag before engaging said terrain avoidance maneuver.

The invention further relates to an aircraft provided with a terrain avoidance system such as mentioned above.

BRIEF DESCRIPTION OF THE DRAWINGS

The figures of the appended drawing will elucidate the manner in which the invention may be embodied. In these figures, identical references designate similar elements.

DETAILED DESCRIPTION

Figure 1:
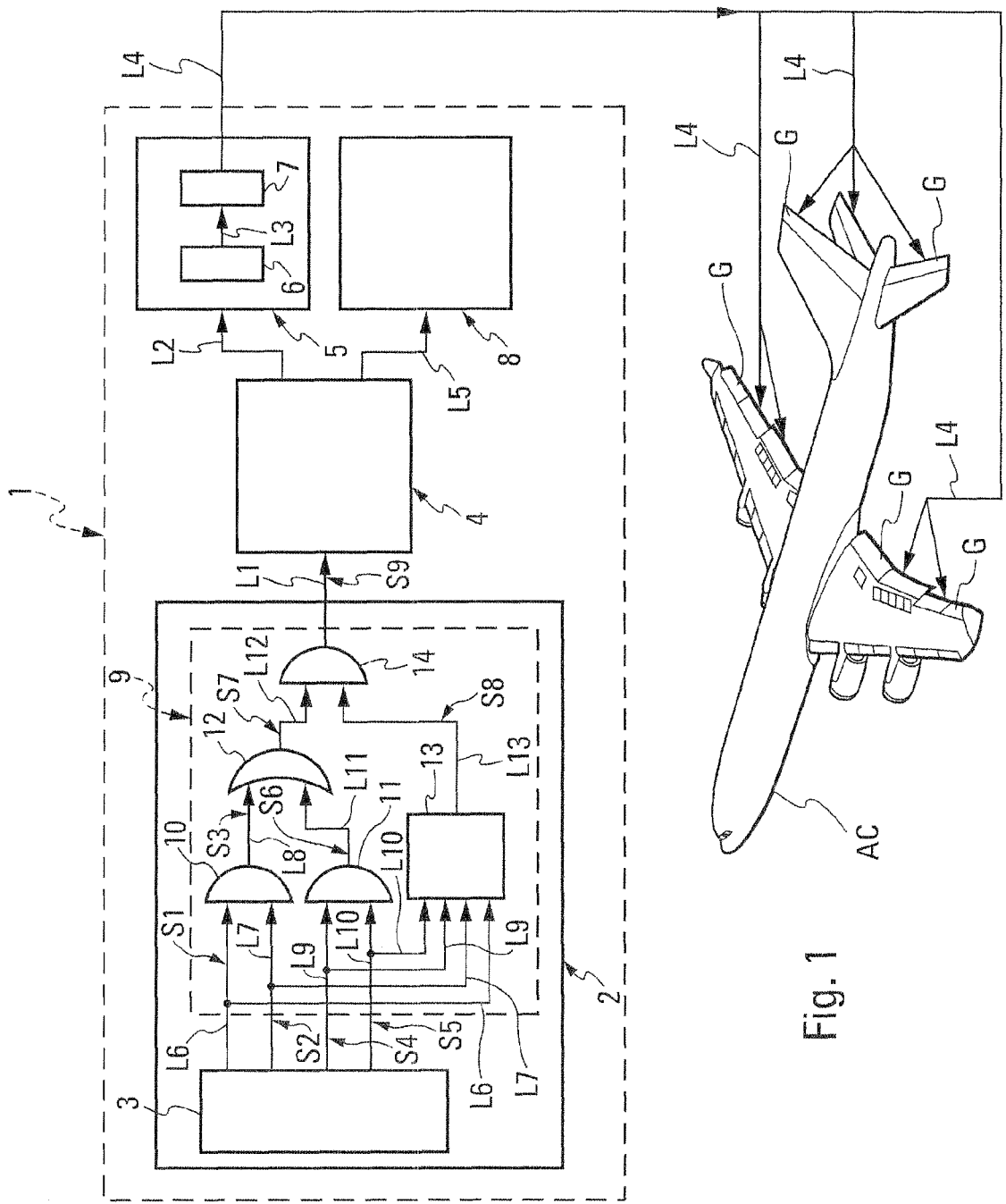
FIG. 1 represents, in the form of a schematic diagram, a terrain avoidance system in accordance with the present invention, carried onboard an aircraft.

The terrain avoidance system 1, in accordance with the present invention and represented schematically in FIG. 1, is a terrain avoidance system for an aircraft AC.

In this FIG. 1, the terrain avoidance system 1 is represented outside the aircraft AC, whereas, in reality, it is mounted onboard the latter.

In a standard manner, the system 1 comprises:
  a collision alert device 2, for example of TAWS type, which monitors the flight of the aircraft AC with respect to the surrounding terrain. This collision alert device 2 is liable to emit reactive and predictive alerts, by way of emission means 3, when the aircraft AC risks colliding with a relief of said terrain in the event it maintains its current flight characteristics (speed, slope, etc.);
  an automatic piloting device 4 of the aircraft AC, connected by way of a link L1 to the collision alert device 2. This automatic piloting device 4 is able to determine and to apply a terrain avoidance maneuver to said aircraft AC when engagement conditions (detailed subsequently) are validated. Accordingly, said automatic piloting device 4 can, in a standard manner, determine piloting commands for said aircraft AC (for example a climb command to be applied to the aircraft AC to bring about a gain of height with respect to the relief of the terrain, or else a climb command for the aircraft AC as well as a heading command to be applied to said aircraft AC). Said automatic piloting device 4 can form part of a standard automatic pilot of the aircraft AC;

control means 5 which are connected to the automatic piloting device 4, by way of the link L2. As a variant, they can be integrated, at least in part, into the automatic piloting device 4. The control means 5 are able to receive the piloting commands originating from said automatic piloting device 4. They comprise for example calculation means 6 for determining airfoil deflection commands, on the basis of the piloting commands received, and means of actuation 7 of at least one airfoil G of said aircraft AC which receive these airfoil deflection commands, by way of the link L3, and move said airfoil G accordingly by means of the link L4; and indication means 8, connected to said automatic piloting device 4, by way of the link L5. These indication means 8 can make it possible to forewarn the pilot or pilots of the aircraft AC when an avoidance maneuver is applied to it. Such an indication can consist of a visual information cue displayed on a viewing screen (for example mounted in the flight deck of the aircraft AC) and/or of an audible alarm. Furthermore, they can also allow the broadcasting of a visual and/or audible warning upon the emission of reactive and/or predictive alerts by the collision alert device 2.

According to the invention, the collision alert device 2 furthermore comprises a verification logic device 9 for verifying said engagement conditions, which is connected to said means for emitting alerts 3. As a variant, the verification logic device 9 can be integrated into the automatic piloting device 4.

In one embodiment of the invention, this verification logic device 9 comprises:

a first AND logic gate 10 with two inputs and one output. One of the two inputs of the first AND gate 10 is intended to receive an alert signal S1 representative of a Mode 2 reactive alert, by way of the link L6. The other input of the first AND gate 10 is on the other hand intended to receive an alert signal S2 representative of an FLTA predictive alert, by way of the link L7. Thus, the first AND logic gate 10 is able to emit as output, by way of the link L8, a first signal S3 representative of a risk of collision (and more precisely of a conflict with the relief of the terrain overflown by the aircraft AC) when it receives simultaneously, on each of its inputs, the alert signals S1 and S2;

a second AND logic gate 11 with two inputs and one output. One of the two inputs of the second AND gate 11 is intended to receive an alert signal S4 representative of a Mode 1 reactive alert, by way of the link L9. The other input of the second AND gate 11 is on the other hand intended to receive an alert signal S5 representative of an independent Mode 1 reactive alert, by way of the link L10. Thus, the second AND logic gate 11 is able to emit as output, by way of the link L11, a second signal S6 representative of a risk of collision (and more precisely of an excessive descent of the aircraft AC) when it receives simultaneously, on each of its inputs, the alert signals S4 and S5; and an OR logic gate 12 with two inputs and one output. One of the two inputs of the OR logic gate 12 is connected to the output of the first AND logic gate 10, by way of the link L8, and the other is connected to the output of the second AND logic gate 11, by way of the link L11. The OR logic gate 12 is able to deliver as output, by way of the link L12, a confirmation signal S7 representative of a risk of collision of the aircraft AC with the terrain when it receives at least one of the signals S3 or S6.

Of course, in a variant of the embodiment of the invention, different combinations of the aforesaid alerts or combinations of some of the aforesaid alerts with other alerts (for example a PDA predictive alert) can be envisaged so as to detect different types of risks of collision.

The verification logic device 9 also comprises comparison means 13 for comparing the duration of emission of each of the alerts emitted by the means for emitting alerts 3 with a predetermined duration threshold (for example a few seconds). Thus, the comparison means 13 are able to deliver as output, by way of the link L13, a signal S8 representative of the fact that at least one of the emitted alerts is emitted continuously for at least said duration threshold.

It comprises moreover a third logic gate 14 of AND type, with two inputs and one output. It is able to receive as input the signals S7 and S8, by way respectively of the links L12 and L13, and to deliver as output, by way of the link L1, a signal S9 representative of the requirement to engage a terrain avoidance maneuver.

According to the embodiment, the conditions for engaging a terrain avoidance maneuver are satisfied when:

at least one of said following alert conditions is satisfied:
the Mode 2 reactive alert and the FLTA predictive alert are emitted simultaneously by the emission means 3 of the collision alert device 2;
the Mode 1 reactive alert and the independent Mode 1 reactive alert are emitted simultaneously by the emission means 3 of the collision alert device 2; and at least one of said alerts (Mode 1, independent Mode 1, Mode 2 or FLTA) is emitted continuously for at least the predetermined duration threshold.

The validation of the conditions for engaging said avoidance maneuver can be accompanied by the broadcasting of a visual and/or audible information cue (for example an alarm) to inform the pilots of the aircraft of a risk of collision with the terrain and warn them of the future triggering of the avoidance maneuver.

When the engagement conditions are validated, the terrain avoidance maneuver, determined by the automatic piloting device 4 of the system 1, can be applied to the aircraft AC with a predefined lag (for example a few seconds) after the validation of the engagement conditions, so as to allow the pilots to react manually.

Moreover, in the case where the emission of the aforesaid reactive and predictive alerts is accompanied by the broadcasting of a visual and/or audible warning to inform the pilots of a potential risk of collision, the predefined lag can be reduced with respect to that implemented when there is no warning broadcast, so as to anticipate the terrain avoidance maneuver and thus increase its chances of success.

Figure 2:
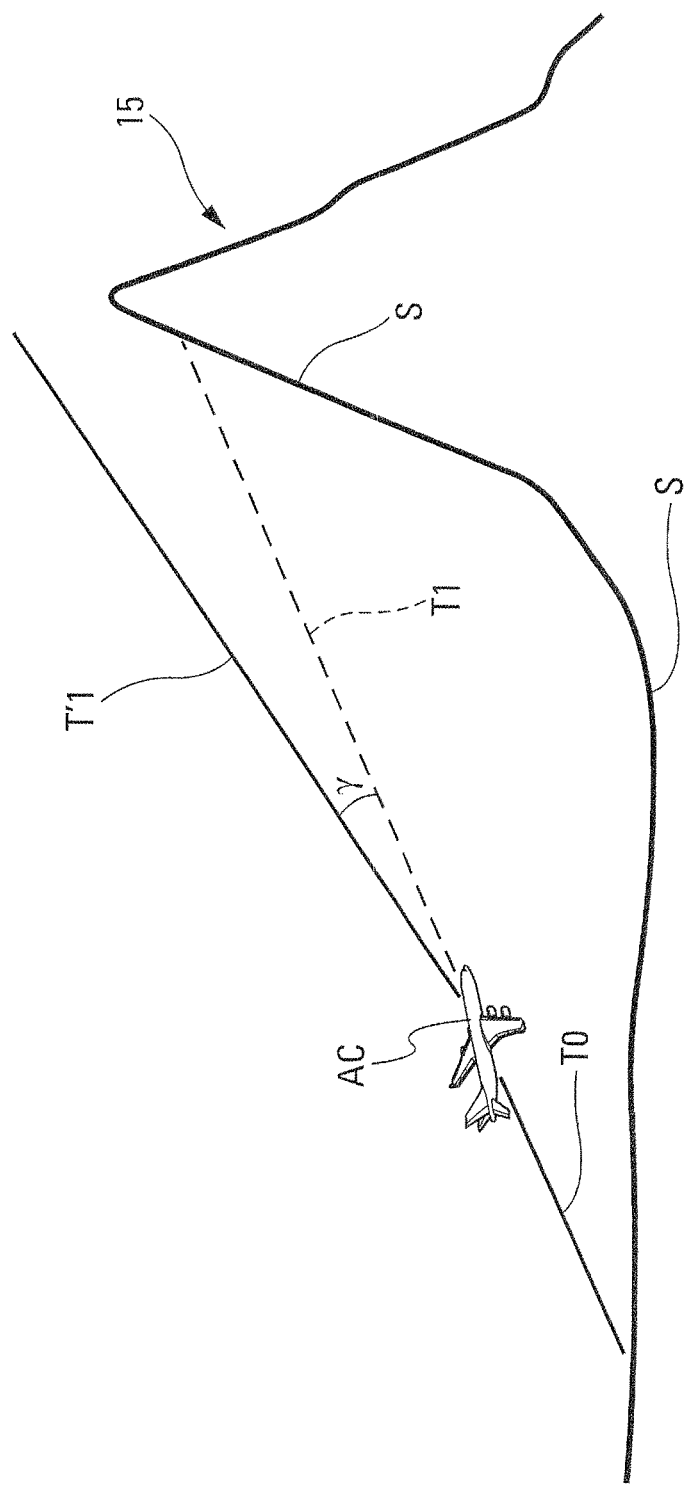
FIG. 2 is a schematic view illustrating a relief avoidance maneuver of the aircraft of FIG. 1, in accordance with the invention.

Represented in FIG. 2 is an example illustrating a terrain S relief avoidance maneuver by the aircraft AC, in which it is assumed that the avoidance maneuver is triggered automatically as soon as the engagement conditions are satisfied (that is to say the predefined lag is zero). The aircraft AC is represented at the moment of the emission, by the collision alert device 2, of the signal S7 (FIG. 1) representative of the requirement to engage an avoidance maneuver. The aircraft AC does indeed risk colliding with the terrain S (mountain 15) if it continues its flight unaltered, as illustrated by the trajectory T1 (broken line) extending the current trajectory T0. At this moment, the terrain avoidance system 1 subjects the aircraft AC automatically to an additional climb command exhibiting a slope γ which is added to the slope corresponding to the current trajectory T0, so that the aircraft AC then no longer follows the trajectory T1, but an additional climb trajectory T1'.

The invention claimed is:

1. A terrain avoidance method for an aircraft, the method comprising
   receiving a first alert,
      wherein the first alert indicates that the aircraft risks colliding with terrain if at least one current flight characteristic is maintained,
      wherein the first alert is emitted based on information provided by a first measurement chain;
   receiving a second alert,
      wherein the second alert indicates that the aircraft risks colliding with terrain if at least one current flight characteristic is maintained,
      wherein the second alert is emitted based on information provided by a second measurement chain;
   wherein the first measurement chain is independent and distinct from the second measurement chain;
   engaging a terrain avoidance maneuver only when an engagement condition is validated,
   wherein the engagement condition is validated only when the first alert and the second alert are emitted simultaneously.

2. The method as claimed in claim 1, said aircraft being equipped with at least one radioaltimeter,
   wherein the first alert is a Mode 2 reactive alert, the triggering of which depends on the height of said aircraft above the terrain as determined by said radioaltimeter and also on the temporal derivative of this height; and
   wherein the second alert is an FLTA predictive alert, the triggering of which relies on information contained in at least one topographic database giving the altitude of the terrain.

3. The method as claimed in claim 1, said aircraft being equipped with at least one radioaltimeter, with inertial platforms and with positioning means of GPS type,
   wherein the first alert is a Mode 1 reactive alert, the triggering of which depends on the height of said aircraft above the terrain as determined by said radioaltimeter, and also on the vertical speed of said aircraft as provided by said inertial platforms;
   wherein the second alert is an independent Mode 1 alert, the triggering of which depends, on the one hand, on the height of said aircraft above the terrain as determined by said GPS positioning means and also on a topographic database giving the altitude of the terrain and, on the other hand, on the vertical speed of said aircraft as provided by said GPS positioning means.

4. The method as claimed in claim 1, further comprising receiving a third alert,
   wherein the third alert indicates that the aircraft risks colliding with terrain if at least one current flight characteristic is maintained,
   wherein the third alert is emitted based on information provided by a third measurement chain;
   receiving a fourth alert,
      wherein the fourth alert indicates that the aircraft risks colliding with terrain if at least one current flight characteristic is maintained,
      wherein the fourth alert device is emitted based on information provided by a fourth measurement chain;
   wherein the third measurement chain is independent and distinct from the fourth measurement chain;
   wherein the engagement condition is validated only when the first alert and the second alert are emitted simultaneously and when the third alert and the fourth alert are emitted simultaneously.

5. The method as claimed in claim 1, wherein the engagement condition is validated only when at least one of said alerts is emitted continuously, by said collision alert device, for at least one predetermined duration threshold.

6. The method as claimed in claim 1, wherein, when the engagement condition is validated, a predefined lag is waited before engaging said terrain avoidance maneuver.

7. A terrain avoidance system for an aircraft, said system comprising:
   a collision alert device which monitors the flight of said aircraft with respect to the surrounding terrain and which is able to emit at least a first alert, indicating that the aircraft risks colliding with terrain if at least one current flight characteristic is maintained, wherein the first alert is emitted based on information provided by a first measurement chain, and
   a second alert indicating that the aircraft risks colliding with terrain if at least one current flight characteristic is maintained, wherein the second alert is emitted based on information provided by a second measurement chain;
   wherein the first measurement chain is independent and distinct from the second measurement chain;
   an automatic piloting device that engages a terrain avoidance maneuver only when an engagement condition is validated, wherein the engagement condition is validated only when the first alert and the second alert are emitted simultaneously.

8. The system as claimed in claim 7, further comprising a comparison means, able to compare the duration of continuous emission of alerts, emitted by said collision alert device, with a predetermined duration threshold, so that said engagement conditions are validated when at least one of the first alert and the second alert is emitted continuously for a duration at least equal to said threshold.

9. The system as claimed in claim 7, wherein when said engagement conditions are validated, said automatic piloting device waits a predefined lag before engaging said terrain avoidance maneuver.

10. An aircraft, which is provided with a terrain avoidance system such as specified under claim 7.

* * * * *